US006763466B1

(12) United States Patent
Glover (10) Patent No.: US 6,763,466 B1
(45) Date of Patent: Jul. 13, 2004

(54) FAST VIRUS SCANNING (75) Inventor: Michael Glover, Bournemouth (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/481,053

(22) Filed: Jan. 11, 2000

(51) Int. Cl.[7] .................................................. H04L 9/00
(52) U.S. Cl. ....................... 713/200; 713/201; 713/188; 713/189; 713/193
(58) Field of Search ................................. 713/188, 189, 713/193, 200, 201

(56) References Cited

U.S. PATENT DOCUMENTS

| 5,359,659 A | * | 10/1994 | Rosenthal | 713/200 |
| 5,440,723 A | * | 8/1995 | Arnold et al. | 714/2 |
| 5,473,769 A | | 12/1995 | Cozza | 395/183.15 |
| 5,502,815 A | | 3/1996 | Cozza | 395/183.14 |
| 5,649,095 A | | 7/1997 | Cozza | 395/183.15 |
| 5,918,008 A | * | 6/1999 | Togawa et al. | 713/200 |
| 5,964,889 A | * | 10/1999 | Nachenberg | 714/25 |
| 5,999,723 A | * | 12/1999 | Nachenberg | 703/22 |

OTHER PUBLICATIONS

Apple Worldwide Developer Technical Support, "Technote 1150: HFS Plus Volume Format," http://developer.apple.com/technotes/tn/tn1150.html, pp. 1–50.
Inside Macintosh, More Macintosh Toolbox, "Chapter 1: Resource Manager," Addison–Wesley Publishing Company, pp. 1–3 and 1–41, 1–121 through 1–126.

* cited by examiner

Primary Examiner—Thomas R. Peeso
(74) Attorney, Agent, or Firm—Blakely, Sokoloff, Taylor & Zafman LLP; Christopher J. Hamaty (57) ABSTRACT Anti-virus state information for a file is stored within an associated data structure that is created and/or maintained by the file system of the computer. The data structure can be a file directory entry with the anti-virus state information being stored in unused fields of the entry. For file systems that maintain separate entities for the data and resource information of a file, the anti-virus state information can be stored in the resource entity or in a specifically created entity.

25 Claims, 6 Drawing Sheets

| | | |
|---|---|---|
| 501 | Record Type | |
| 502 | Flags | |
| 503 | Checksum + 2 bytes of Resource Fork Length | |
| 504 | File Identifier | |
| 505 | Creation Date | |
| 506 | Content Modification Date | |
| 507 | Attribute Modification Date | |
| 508 | Access Date | |
| 509 | Backup Date | |
| 510 | Permissions | |
| 511 | User Information | |
| 512 | Finder Information | |
| 513 | Text Encoding | |
| 514 | 1 byte of Resource Fork Length + Data Fork Length | |
| 515 | Data Fork Data | |
| 516 | Resource Fork Data | |

| | | |
|---|---|---|
| 521 | Resource Header | |
| 524 | Length of AV State Information | 522 |
| 525 | AV State Information | |
| 526 | File Identifier | |
| 527 | Resource Type List | 523 |
| 528 | Reference Lists | |

FAST VIRUS SCANNING

RELATED APPLICATION

The present application is related to application Ser. No. 09/481,060, titled "Fast Virus Scanning using Session Stamping, assigned to the same assignee as the present application and filed on the same day.

FIELD OF THE INVENTION

This invention relates generally to computer virus detection, and more particularly to virus scanning.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Network Associates, Inc., All Rights Reserved.

BACKGROUND OF THE INVENTION

Anti-virus (AV) programs are, by design, fairly intrusive applications. They must sit between a user—or the user's applications—and the computer's file system, to ensure that infected files are not written to the file system. If infected files already reside on the file system, the AV program must ensure that they are not executed or copied to other computers.

AV programs scan computer files for known viruses by comparing each file to a list of "virus signatures" that are stored in "virus signature files." The scanning can be done upon request of a user, when the file is accessed on a mass storage device such as by an application, or on a scheduled basis. Virus scanning is, therefore, a resource intensive (CPU and disk I/O) and time-consuming task, especially in the case of access scanning. Oftentimes, a user's file-open request must be delayed until the file can be scanned and possibly cleaned. This resource consumption can lead to a degradation of a computer's overall performance and slower response times for users.

Various techniques are currently used to reduce the amount of time and computer resources required by AV scanning. The techniques share the concept of saving set of parameters, an AV "state," for the file as of the last scan so that once a file has been scanned and found free of infection, it should not need to be scanned again unless the file is modified. The parameters chosen for the AV state are indicative of virus infection if changed, such as the file's length, checksum, and date of last file write operation.

One common technique is to create an in-memory or on-disk cache containing the AV state for files that have been scanned during recent executions of the AV program. The cache is checked whenever a file is accessed or when a scheduled scan is due. If the file's AV state is in the cache, the AV state parameters for the file in the scan information cache are checked against the current parameters of the file. If the parameters match, a virus scan is not necessary. If the parameters do not match, or if the AV state for the file is not cached, then the file is scanned and the cache information updated. The drawback to this approach is that such caches are limited to a reasonable memory size and cannot efficiently track all the files (potentially millions) that may reside on a file server, or even the smaller number that reside on individual stand-alone personal computers. Because the cache is volatile, the AV state for only the most recently used files will be present in the cache.

Another approach stores the AV state (often just a checksum) in an external database that is then compared against the current values of the AV state parameters when the file is accessed. This technique is only effective if the AV state information is thoroughly secure against unauthorized changes. The user or administrator also faces the challenges inherent in maintaining the external database. Additionally, the database technique requires that the AV state is accessed separately from the file itself, thus incurring system overhead. The total processing cost of generating the AV state, storing it in the external database and retrieving it when needed can exceed the cost of scanning the file.

An alternate technique that is similar to the external database approach addresses the cost of accessing the AV state separately from the file itself by appending the AV state (again frequently just a checksum) to the end of the file. However, this scheme is less secure than the others in that a sophisticated virus can overwrite the checksum with the value for the infected file. Additionally, since the AV program modifies the file, errors in the program may cause loss of user data. Additionally, since the AV program modifies the file, errors in the program may cause loss of user data. Moreover, the addition of information to a file can cause various system utilities to assume the file is bad, causing the original version of the file to be reloaded, or it may be viewed as virus-like behavior, triggering a false alarm. This technique is also disfavored by users and systems administrators who are reluctant to give a third-party the right to modify their files.

Therefore, the current techniques used by AV programs provide only limited savings of user time and system resources when scanning files, while often introducing other risks and complications as a result.

SUMMARY OF THE INVENTION

The above-mentioned shortcomings, disadvantages and problems are addressed by the present invention, which will be understood by reading and studying the following specification.

Anti-virus (AV) state information for a file on a computer is stored within an associated file data structure managed by the file system of the computer. The AV state information is obtained from the data structure when the data structure has been retrieved by the file system as a result of the file being accessed. Because the data structure is automatically retrieved into memory by the file system, the invention incurs minimal resource overhead and provides fast retrieval of the AV state information. For files systems that have at least one reserved field in the directory entry for a file, the AV state information is stored into that field(s). An alternate aspect of the invention operates with file systems that maintain the data and resource information for a file as separate entities ("forks") by storing the AV state information in the resource fork or in a special AV state fork.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into three sections. In the first section, the hardware and the operating environment in conjunction with which embodiments of the invention may be practiced are described. In the second section, a system level overview of the invention is presented. In the third section, methods and data structures for embodiments of the invention are described.

Operating Environment

Figure 1:
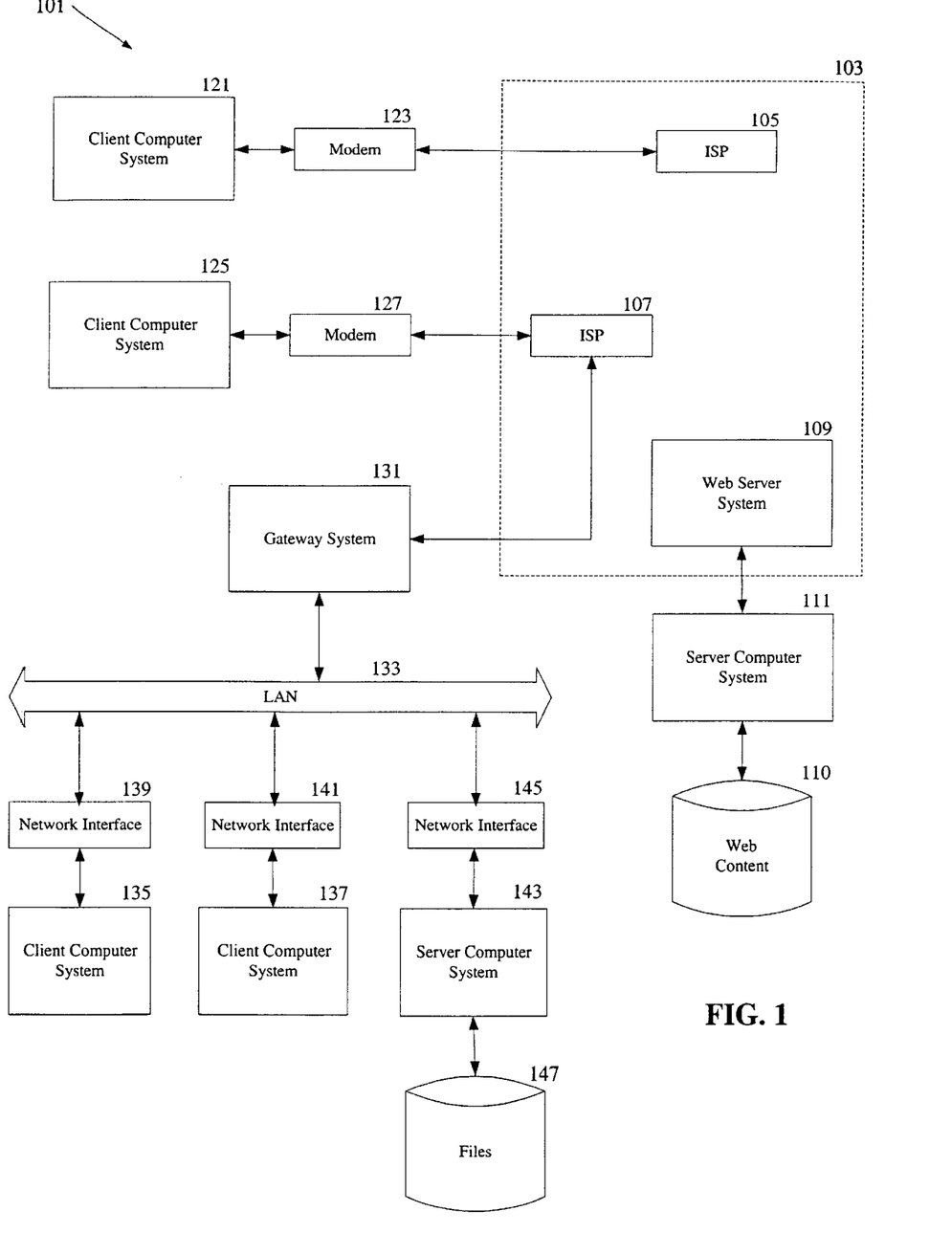
FIG. 1 is a diagram of one embodiment of an operating environment suitable for practicing the present invention.
Figure 2:
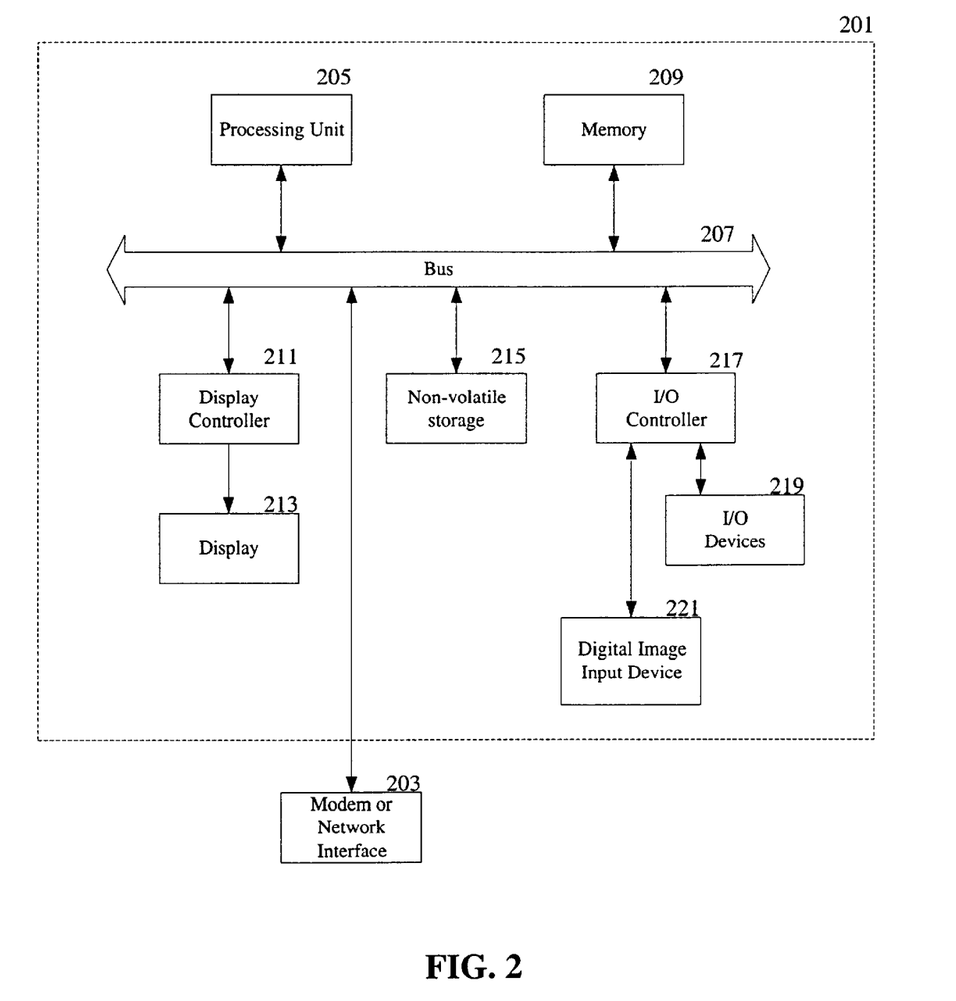
FIG. 2 is a diagram of one embodiment of a computer system suitable for use in the operating environment of FIG. 1.

The following description of FIGS. 1 and 2 is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems 101 that are coupled together through a network 103, such as a local-area network (LAN) or the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML format. These documents are often provided by web servers, such as web server 109 which is considered to be "on" the Internet. Often these web servers are provided by the ISPs, such as ISP 105, although a computer system can be set up and connected to the Internet without that system being also an ISP as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to the server computer system 111 which itself is coupled to web content 110, which can be considered a form of a media database. It will be appreciated that while two computer systems 109 and 111 are shown in FIG. 1, the web server system 109 and the server computer system 111 can be one computer system having different software components providing the web server functionality and the server functionality provided by the server computer system 111.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer or other similar computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 1 shows the interfaces 123 and 127 generically as modems, it will be appreciated that each of these interfaces can be an analog modem, ISDN modem, cable modem, satellite transmission interface, or other interfaces for coupling a computer system to other computer systems. Client computer systems 135 and 137 are coupled to a LAN bus 133 through network interfaces 139 and 141, which can be Ethernet network or other network interfaces. The LAN bus 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Alternatively, as well-known, a server computer system 143 can be directly coupled to the LAN bus 133 through a network interface 145 to provide files 147 and other services to the clients 135, 137, without the need to connect to the Internet through the gateway system 131.

FIG. 2 shows one example of a conventional computer system that can be used as a client computer system or a server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to non-volatile storage 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The non-volatile storage 215 is often a magnetic hard disk, an optical disk, or another form of storage for large amounts of data. Some of this data is often written, by a direct memory access process, into memory 209 during execution of software in the computer system 201. One of skill in the art will immediately recognize that the term "computer-readable medium" includes any type of storage device that is accessible by the processor 205.

It will be appreciated that the computer system 201 is one example of many possible computer systems which have different architectures. For example, personal computers often have multiple buses, one of which can be considered to be a peripheral bus. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the Windows family of operating systems from Microsoft Corporation of Redmond, Wash., including the workstation and server versions. Another example is the Macintosh operating system from Apple Computer, Inc. of Cupertino, Calif. The file management system is typically stored in the non-volatile storage 215 and causes the processor 205 to execute the various acts required by the operating system to input and output data and to store data in memory, including storing files on the non-volatile storage 215.

System Level Overview

A system level overview of the operation of an embodiment of the invention as incorporated into an anti-virus software program is described by reference to FIGS. 3A and 3B in which actions taken by the anti-virus software are illustrated by numbered arrows. The anti-virus software program 305 executes on a computer, such as a server 111 in FIG. 1, or a individual client computer, such as client 121, 125, 135, 137. A file system, executing as part of the operating system as described previously in conjunction with FIG. 2, controls access to the files stored on non-volatile storage, such as storage 215 in FIG. 2.

Figure 3A:
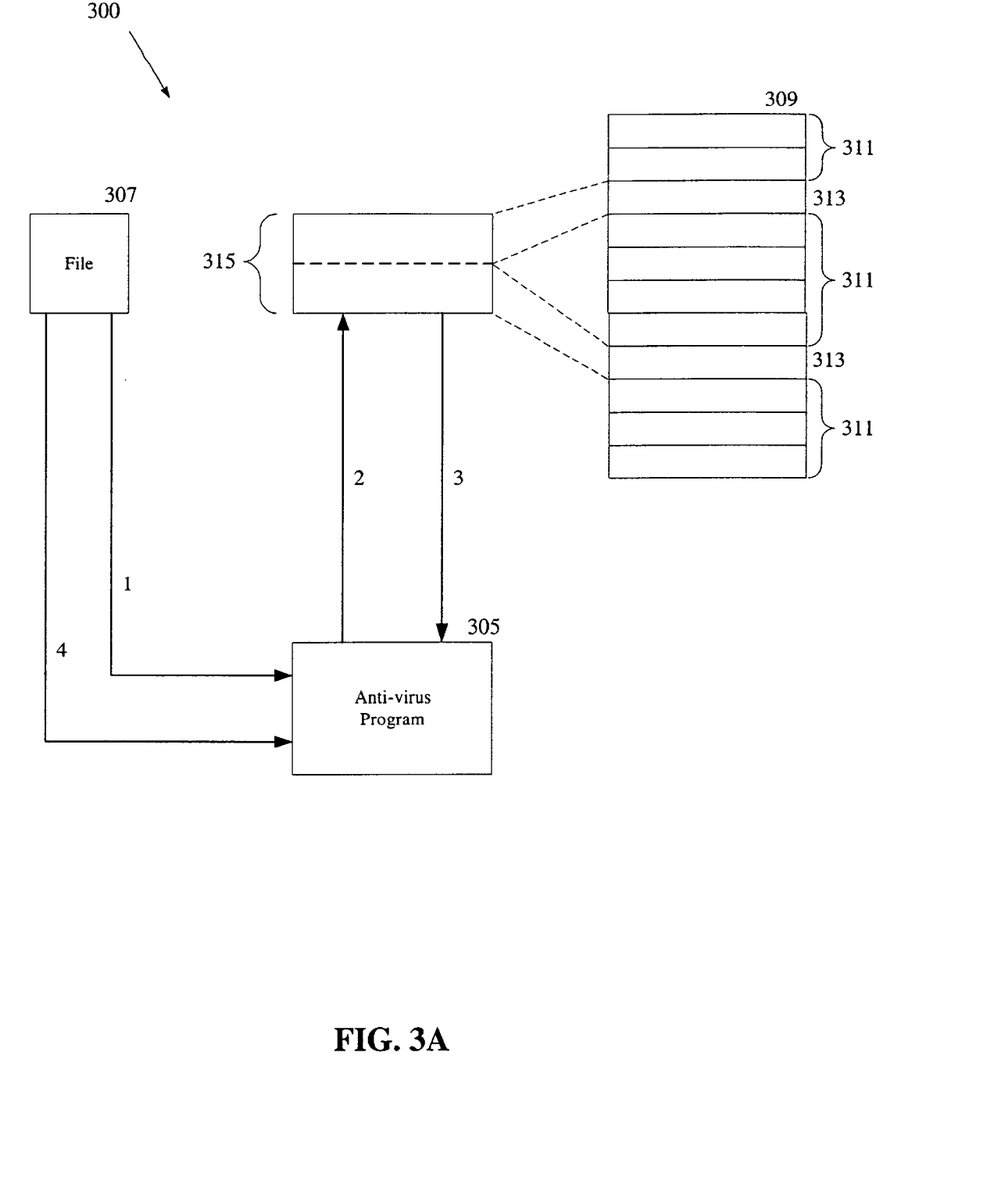
FIG. 3A is a diagram illustrating a system-level overview of one embodiment of the invention.

In the embodiment illustrated in FIG. 3A, the file system maintains an entry data structure 309 in a directory for each file 307. The entry data structure 309 holds information about the corresponding file 307, such as file type, file identifier, creation date, etc., in standard fields 311. The entry data structure 309 also often includes reserved fields 313 that are unused in the current version of the file system. Because the reserved fields 313 are normally reserved for future use by the developer of the operating system, it will be appreciated that the use of such reserved fields by the developer of the operating system to store AV state information is as equally within the scope of the invention as the similar use by a third-party developer of an anti-virus program.

When the file 307 is created by the file system, the anti-virus program 305 scans 1 the file for known viruses. The anti-virus program 305 stores 2 AV state information 315 in the reserved fields 313 in the entry data structure 309 for the file 307. The AV state information 315 also can be encrypted by the anti-virus program to protect it from malicious modification.

The AV state information 315 includes parameters that are indicative of virus infection if changed from a previous scan, such as size, checksum, and last-modified data stamp. The AV state information 315 can optionally include an indicator as to whether the file is infected. As illustrated in FIG. 3A, when the reserved fields 313 used to hold the AV state information are not contiguous, the AV state information 315 is partitioned into segments corresponding to the sizes of the reserved fields 313. It will be appreciated that each segment can contain more than one AV state parameter and that a single AV state parameter can span reserved field. Alternatively, if the AV state information 315 is larger than the space available in reserved fields 313, the anti-virus program 305 can create additional fields within the directory entry data structure 309 when it is installed on the computer using conventional "patching" techniques.

When the file 307 is next accessed, the entry data structure 309 is automatically read into memory by the file system, if it is not already cached. The anti-virus program 305 obtains 3 the AV state information 315 from the reserved fields 313 (decrypting it, if necessary) and compares the saved AV state information with the corresponding information currently associated with the file. If the current information is different from that stored in the AV state information 315, the file 307 is re-scanned 4 and the AV state information 315 is updated 2 with the results. Furthermore, access to the file 307 may be limited or refused by the operating system if the AV state information 315 indicates the file is infected.

Because the AV state information is stored as part of the directory entry data structure for a file, it is immediately available as a result of the file system operation when the file is accessed. No additional retrieval operation is required, as when the AV state information is stored in an external database. Furthermore, because the directory entry data structure is cached in system memory, the AV state is more quickly accessed than when it is stored in a user-controlled cache.

Figure 3B:
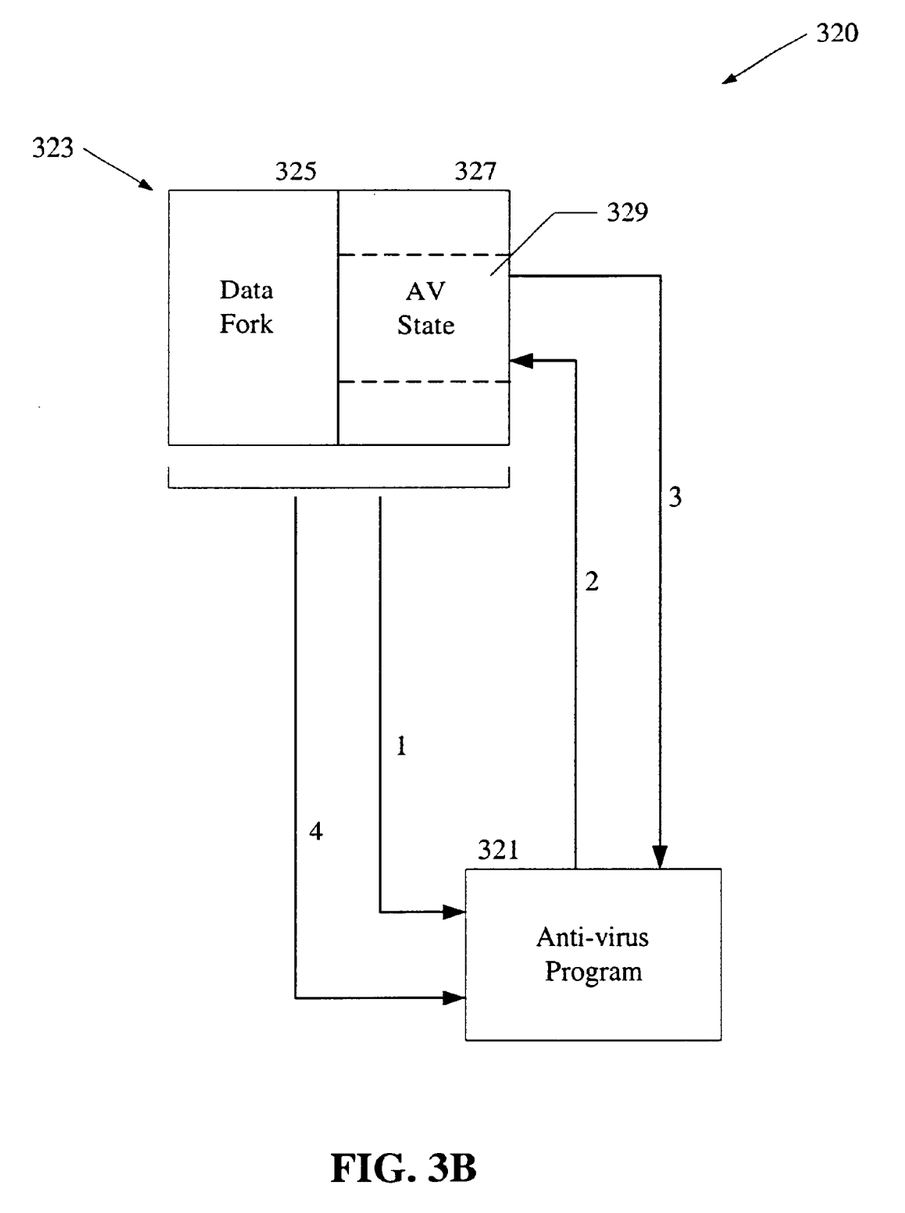
FIG. 3B is a diagram illustrating system-level overview of an alternate embodiment of the invention.

An alternate embodiment of the invention shown in FIG. 3B can be used with file systems that maintain the data and resource information for a file 323 in separate "fork" data structures, such as the file system associated with the Macintosh operating system. The anti-virus program 321 scans 1 the file 323 and stores 2 the AV state information 329 in the resource fork 327. When the file 323 later accessed, the anti-virus program 321 reads 3 the AV state information 329 from the resource fork 327 to determine if the file 323 needs to be re-scanned 4. It will be appreciated that the resource fork 327 illustrated in FIG. 3B can be the standard resource fork data structure that has been modified to hold the AV state information 329 by the anti-virus program, or it can be an extra file fork data structure created to hold the AV state information 329 in a file system that supports special application-defined forks. It will further be appreciated that the extra file fork data structure is not limited to the arrangement of fields illustrated for the resource fork 327 in FIG. 5B, but can be organized in any format supported by the underlying file system. Again, the AV information can be encrypted before being stored as an extra layer of security.

Because the file system manages access to the standard resource fork data structure, no additional file operation is necessary to store or retrieve the AV state for the file beyond than normally required to access the resource fork. When the AV state information stored in a special AV resource fork data structure, the AV resource fork can quickly be retrieved when the file system retrieves the data and/or the standard resource fork. Furthermore, because the resource fork data structures are managed as part of the file by the file system, the application merely requests that the AV state be stored and does not have be concerned with managing an external AV state data structure.

The system level overview of the operation of an embodiment of the invention has been described in this section of the detailed description. AV state information for a file is stored within an associated data structure that is created and/or maintained by the file system of the computer. Because the data structure holding the AV state information is automatically retrieved into memory by the file system when the file is accessed, the invention incurs minimal resource overhead and provides fast retrieval of the AV state information. While the invention is not limited to practice with any file system data structure, for sake of clarity simplified directory entry data structure and file resource fork embodiments have been described.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, process, procedure, application . . . ), as taking an action or causing a result. Such expressions are merely a shorthand way of saying that execution of the software by a computer causes the processor of the computer to perform an action or a produce a result.

Figure 4:
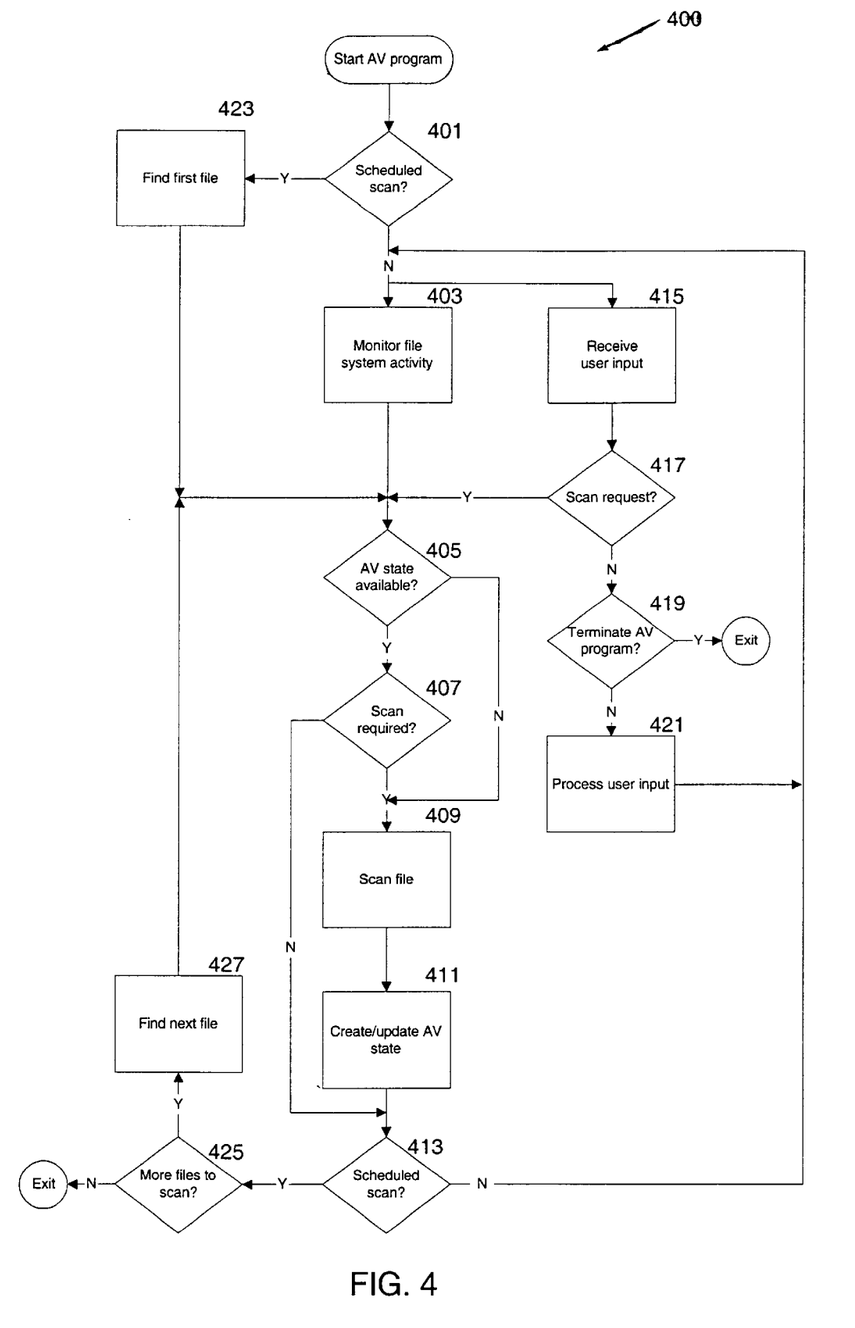
FIG. 4 is a flowchart of a method to be performed by a computer according to an embodiment of the invention.

Referring to FIG. 4, the acts to be performed by a computer executing an anti-virus method 400 that incorporates the present invention are shown. It will be appreciated that the method 400 is designed to operate with any of the embodiments described above in conjunction with FIGS. 3A and 3B.

When the anti-virus method 400 is initiated, it checks if a scheduled scan should be performed (block 401). Scheduled scans are typically carried out as a background task, or overnight, on a pre-defined batch of files. Assuming for the moment that a scheduled scan is not due, the anti-virus program initiates two parallel tasks. One task monitors file system activity to detect when a file is created, accessed, or modified (block 403). When such activity occurs, the method 400 checks the associated file system data structure to determine if the AV state information exists (block 405). If it does, the AV state information is compared with the current state of the file to determine if the file needs to be re-scanned (block 407). When either the AV state does not exist, or the AV state indicates that the file should be re-scanned, the file is scanned (block 409) and the associated file system data structure is created or updated with the resulting AV state information (block 411). Since this task is not a scheduled scan (block 413), the method 400 returns to block 403 to monitor further file system activity.

The second parallel task responds to user input received at block 415. If the user requests a scan of a particular file (block 417), the anti-virus method 400 proceeds to block 405 to execute the process described immediately above. If the user has requested the termination of the anti-virus program, the method 400 exits. All other user input, such as changes in AV program parameters, is processed at block 421.

When the anti-virus method 400 executes a schedule scan (block 401), it takes each file in the batch in turn (blocks 423, 427) and proceeds to block 405 to determine if the file needs to be scanned.

The particular method performed by computer executing of an embodiment of the invention have been described. The anti-virus method has been shown by reference to a flowchart including all the acts from 401 until 427.

Figure 5A:
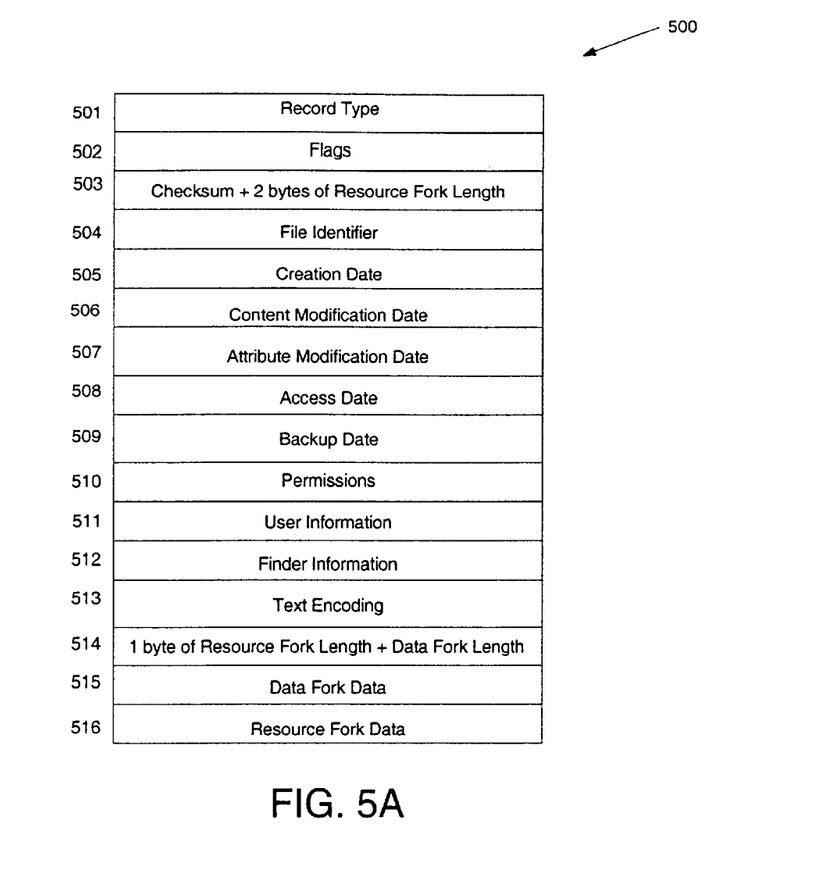
FIGS. 5A–B are diagrams of data structures used by the methods of FIG. 4.
Figure 5B:
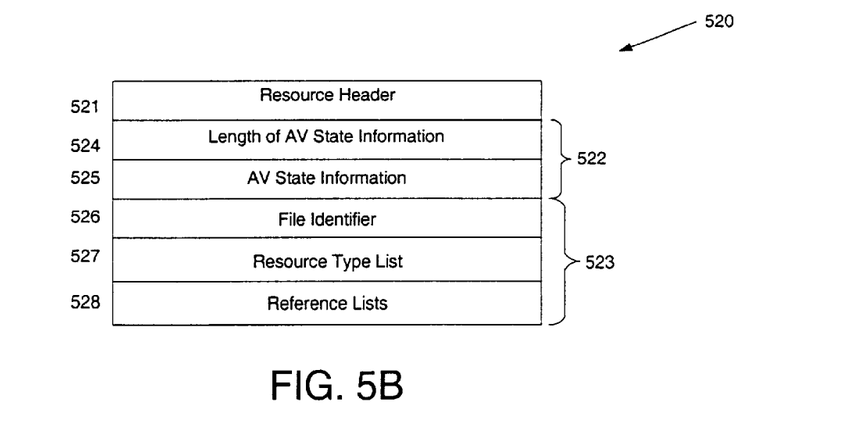

As described previously, the AV state information for a file can be stored in reserved fields in the directory entry for the file or in a separate fork. FIG. 5A illustrates an embodiment in which the AV state information is stored within two reserved fields of a MacIntosh OS 8 HFS Plus catalog file entry. The MacIntosh OS 8 HFS Plus disk volume format is described in Apple Computer, Inc. *Technote* 1150: *HFS Plus Volume Format*, March 1999, available in electronic form as of the filing date of the present application at http:H/ developer.apple.com/technotes/tn/tn 1150.html, and which is incorporated herein by reference. FIG. 5B illustrates an alternate embodiment in which the AV state information is stored in a resource fork for a MacIntosh file. The resource fork structure is described in Apple Computer, Inc., INSIDE MACINTOSH: MORE MACINTOSH TOOLBOX 1–3·1–41, 1–121·125 (1993), available in electronic form as of the filing date of the present application at http:// developer.apple.com/techpubs/mac/MoreToolbox/ MoreToolbox-2.html, and which is incorporated herein by reference.

Turning first to FIG. 5A, each file in the MacIntosh file system is associated with an entry data structure 500 in the catalog file. Fields 501–502 and 504–513 contain standard information about a file such as identifier, creation and modification dates, etc. Fields 515 and 516 contains information about the sizes and locations of the file's data and resource forks, respectively. An embodiment of the AV state information that is eight bytes long and consists of three parameters—a two-byte checksum, a three-byte resource fork length, and a three-byte data fork length—is stored in the reserved fields 503 and 514 of the catalog entry. The field 503 is used to store the first four bytes of the AV state information, i.e., the two-byte checksum, and the first two bytes of the resource fork length, while the reserved field 514 is used to store the second four bytes of the AV state information, i.e., the third byte of the resource fork length, and the three bytes of the data fork length. The anti-virus program performs the functions necessary to divide and reconstruct the AV state information in fields 503 and 514.

FIG. 5B illustrates an alternate embodiment in which the AV state information is stored as a resource in a MacIntosh file resource fork data structure 530. The resource fork data structure 520 contains a resource header section 521, a resource data section 522, and a resource map section 523. The resource data section 522 contains an entry for each resource and is located within the resource fork data structure 520 using the resource type list 527 and reference lists 528 in the resource map section 523. The resource map section also contains a file identifier 526 for the file corresponding to the resource fork. Each resource entry contains the data for the resource and the length of the data. As illustrated in FIG. 5B, field 524 contains the AV state information 525 and length of the AV state information 524 for the file identified by the file identifier 526.

Although specific embodiments for the present have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that any arrangement of AV state information can be stored in the associated data structure.

The terminology used in this application with respect to operating systems is meant to include all operating systems that maintain file directories with at least one reserved field or that can be patched with additional fields. Furthermore, the terminology is meant to include all operating system that maintain data and resource information for a file as separately-accessible entities. Therefore, it is manifestly intended that this invention be limited only by the following claims and equivalents thereof.

What is claimed is:

1. A computerized method for fast virus scanning of a file comprising:
    storing anti-virus state information in a data structure associated with the file and managed by a file system;
    partitioning the anti-virus state information into segments when storing the anti-virus state information in non-contiguous fields in the data structure, each segment being equal in size to one of a plurality of fields in the data structure; and
    obtaining the anti-virus state information for the file from the data structure when the data structure has been retrieved by the file system.

2. The computerized method of claim 1, wherein the data structure is a directory entry for the file and the anti-virus state information is stored in at least one field in the directory entry.

3. The computerized method of claim 2, further comprising:
    creating the at least one field in the directory entry.

4. The computerized method of claim 1, wherein the data structure is an extra file fork for the file.

5. The computerized method of claim 4, further comprising creating the extra file fork to hold the anti-virus state information.

6. The computerized method of claim 1, wherein the data structure is stored as a resource within a resource fork for the file.

7. The computerized method of claim 1, further comprising:
    encrypting the anti-virus state information before storing it in the data structure; and
    decrypting the anti-virus state information when it is obtained from the data structure.

8. The computerized method of claim 1, further comprising:
    comparing the anti-virus state information stored in the data structure against corresponding information associated with a current version of the file to determine if virus scanning is required; and
    updating the anti-virus state information if the file is scanned as a result of the comparison.

9. A The computerized method of claim 1, wherein data structure is retrieved by the file system as a result of the file being accessed by an application program.

10. The computerized method of claim 1, wherein data structure is retrieved by the file system as a result of a user requesting the file be scanned.

11. The computerized method of claim 1, wherein data structure is retrieved by the file system as a result of the file being in a pre-defined list of files scheduled for scanning.

12. A computer-readable medium having stored thereon executable instructions that cause a computer to execute a virus scanning method on a file, the method comprising:
    storing anti-virus state information for the file in a data structure associated with the file and managed by a file system;
    partitioning the anti-virus state information into segments when storing the anti-virus state information in non-contiguous fields in the data structure, each segment being equal in size to one of a plurality of fields in the data structure; and
    obtaining the anti-virus state information for the file from the data structure when the data structure has been retrieved by the file system.

13. The computer-readable medium of claim 12, further comprising:
    encrypting the anti-virus state information before storing it in the data structure; and
    decrypting the anti-virus state information when it is obtained from the data structure.

14. The computer-readable medium of claim 12, further comprising:
    comparing the anti-virus state information stored in the data structure against corresponding information associated with a current version of the file to determine if virus scanning is required; and
    updating the anti-virus state information if the file is scanned as a result of the comparison.

15. The computer-readable medium of claim 12, wherein the data structure is a directory entry for the file and the anti-virus state information is stored in at least one field in the directory entry.

16. The computer-readable medium of claim 12, wherein the data structure is an extra file fork for the file.

17. The computer-readable medium of claim 16, further comprising:

creating the extra file fork to hold the anti-virus state information.

18. A computer system comprising:

a processor coupled to a system bus;

a memory coupled to the processor through the system bus;

a computer-readable medium coupled to the processor through the system bus;

a file system executed from the memory by the processor, wherein the file system causes the processor to store data structures associated with files on the computer-readable medium and further to retrieve the data structures from the computer-readable medium; and an anti-virus process executed from the memory by the processor, wherein the anti-virus process causes the processor to store anti-virus state information for the file in the data structure associated with the file, partition the anti-virus state information into segments when storing the anti-virus state information in non-contiguous fields in the data structure, each segment being equal in size to one of a plurality of fields in the data structure; and further to obtain the anti-virus state information for the file from the data structure when the data structure has been retrieved.

19. The computer system of claim 18, wherein the anti-virus process further causes the processor to encrypt the anti-virus state information before storing it in the data structure and to decrypt the anti-virus state information when it is obtained from the data structure.

20. The computer system of claim 18, wherein the anti-virus process further causes the processor to compare the anti-virus state information stored in the data structure against corresponding information associated with a current version of the file to determine if virus scanning is required and to update the anti-virus state information if the anti-virus process causes the processor to scan the file as a result of the comparison.

21. The computer system of claim 18, wherein the data structure containing the anti-virus state information is an entry in a file system directory and the anti-virus process further causes the processor to store the anti-virus state information in the entry and to obtain the anti-virus state information from the entry.

22. The computer system of claim 18, wherein the data structure containing the anti-virus state information is an extra file fork for the file and the anti-virus process further causes the processor to store the anti-virus state information in the extra file fork and to obtain the anti-virus state information from the extra file fork.

23. The computer system of claim 22, wherein the anti-virus process further causes the processor to create the extra file fork to hold the anti-virus state information.

24. The computer system of claim 18, wherein the data structure containing the anti-virus state information is stored as a resource in a resource fork for the file and the anti-virus process further causes the processor to store the anti-virus state information in the resource fork and to obtain the anti-virus state information from the resource fork.

25. A computer-readable medium, having stored thereon a directory entry data structure for a file system comprising:

a file identifier field containing data representing a file system identifier for a file wherein the file comprises a data fork and a resource fork;

a first reserved field containing data representing an anti-virus state for the file identified by the file identifier field, the data representing a two-byte checksum for the file and two bytes of a three-byte length for the resource fork; and a second reserved field containing data representing a third byte for the resource fork length and data representing a three-byte length for the data fork.

* * * * *